United States Patent [19]

Evans et al.

[11] Patent Number: 4,458,199

[45] Date of Patent: Jul. 3, 1984

[54] LINK REGULATOR WITH FEED FORWARD SWITCHING CONTROL

[75] Inventors: William E. Evans; Jimmie D. Gillett, both of Harland, Tex.

[73] Assignee: Varo, Inc., Garland, Tex.

[21] Appl. No.: 345,669

[22] Filed: Feb. 4, 1982

[51] Int. Cl.³ .............................................. G05F 1/46
[52] U.S. Cl. .................................. 323/286; 318/723; 323/204
[58] Field of Search ............... 323/204, 212, 260, 282, 323/286; 318/716, 717, 720, 722, 723, 807–809, 812

[56] References Cited

U.S. PATENT DOCUMENTS

| 3,593,103 | 7/1971 | Chandler | 318/808 X |
| 3,886,430 | 5/1975 | Meier | 318/807 X |
| 3,886,431 | 5/1975 | Meier | 318/807 X |
| 4,048,554 | 9/1977 | Stich | 318/808 X |
| 4,230,979 | 10/1980 | Espelage et al. | 318/722 X |

Primary Examiner—David Smith, Jr.
Assistant Examiner—Richard M. Moose
Attorney, Agent, or Firm—Jerry W. Mills; Jerry R. Selinger; Gregory M. Howison

[57] ABSTRACT

A link regulator is disclosed for providing a regulated voltage over a wide range of input frequencies and load currents. The frequency of an internal VCO and the input frequency are phase compared to provide a reference error signal. The unregulated DC voltage is integrated for a duration proportional to the error signal. This duration controls a series switching element to provide a constant volts/seconds. The output of the series switching element is filtered to a DC voltage that controls the frequency of the VCO. The DC voltage is proportional to the error signal, thus providing a feed forward system to regulate the DC voltage. During the period when the series switching element is not conducting, a shunt switch presents a low impedance to the input of the filter to clamp the input to ground. This allows for operation over a wide range of load currents without losing regulation.

26 Claims, 5 Drawing Figures

LINK REGULATOR WITH FEED FORWARD SWITCHING CONTROL

TECHNICAL FIELD

The present invention pertains to link regulators and more particularly to link regulators utilizing a feed forward switching control.

BACKGROUND OF THE INVENTION

Switching regulators are normally utilized to provide lightweight high efficiency regulated power supplies. In a basic switching regulator, a switching device is connected in series with a load, and regulation of the output is accomplished by on/off switching of the switching device through a feedback circuit. The feedback circuit samples the output voltage and compares it to a reference voltage. The difference (error signal) between the two voltages is used to control the on/off duty cycle of the switching device. If the output voltage tends to decrease below the reference voltage, the duration of the on time pulse increases. The switching device then conducts for a longer period of time so that the output voltage increases to the desired level. If the output voltage tends to ride above the reference voltage, the duration of the on time pulse decreases. The shorter conduction period of the switching device then results in a compensating difference in the output voltage. Some type of filter is required between the switching device and the load to obtain a smooth DC output. A commonly used filter consists of an LC network and a commutating diode.

An additional disadvantage of a switching regulator is that the capacitor in the output filter can charge to peak values that approach the level of the input voltage if the load current is low. This is usually resolved by adding a shunt load that may be either across the output all the time or just connected when the current in the load is very low. This affects the efficiency of the system because of undesirable dissipation in the shunt load.

The major advantage of the switching regulator over the linear regulator is the higher efficiency that results from the mode of operation of a series pass transistor utilized as the series switching device. In this mode of operation, the transistor is operated in its two most efficient stages, either at cutoff or at saturation. As a result, dissipation is considerably less than when the transistor is operated in the linear region. The response time of the switching regulator, however, is usually slower than that of the linear regulator, but can be improved by operation of this circuit at higher frequencies.

The disadvantage to the above described switching regulator is that the operating frequency is dependent upon the error voltage which may vary over a large range, thus generating an enormous amount of electromagnetic interference (EMI). Switching regulators are usually notorious for their EMI. To improve EMI immunity, methods have been employed such as maintaining a constant frequency into the switching regulator and varying the pulse width. Feedback schemes are dependent both upon their gain and bandwidth in determining their operation characteristics. Depending upon the load and the unregulated input voltage, regulation is determined by the response of the feedback. To correct for both input voltage variations and load changes, the feedback system must compensate by maintaining a high gain. As the frequency changes the feedback system must have a wide bandwidth to accommodate for rapid changes. This is a disadvantage in that high gain and wide bandwidth often result in inherent instabilities.

In view of the above problems, there exists a need for a switching regulator utilizing a switching control that reduces sensitivity to input voltage variations and load changes while maintaining a high gain and wide bandwidth.

SUMMARY OF THE INVENTION

The present invention comprises a method for controlling the switch in a switching regulator by the following steps. The switch is turned on and the level of the unregulated DC voltage is sensed. The unregulated DC voltage level is integrated over time to provide an integrated voltage level. When the integrated voltage level exceeds a preset threshold the switch is turned off. Periodically, the integrator is reset to zero and the switch is turned on wherein the interval of the unregulated DC voltage provides a constant volt/seconds. The output of the switch is filtered to provide a regulated DC voltage that is proportional to the preset threshold.

In accordance with another aspect of the present invention, a reference frequency signal is received and a driving frequency signal is phase synchronized to the reference frequency. The phase of the driving frequency and the phase of the output frequency are compared to generate the preset threshold level.

In accordance with yet another aspect of the present invention, a circuit for controlling the switch in a switching regulator comprises a driving circuit for turning the switch on and an integrator for integrating the unregulated DC voltage level over time to provide the integrated voltage level. A comparator compares the integrated voltage level with the preset threshold to turn off the switch when the integrated voltage level exceeds the preset threshold. A pulse generator having a constant period resets the integrator to zero and turns the switch on for every cycle of the pulse generated. An LC filter filters the output of the switch, thus providing a regulated DC voltage that is proportional to the preset threshold.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
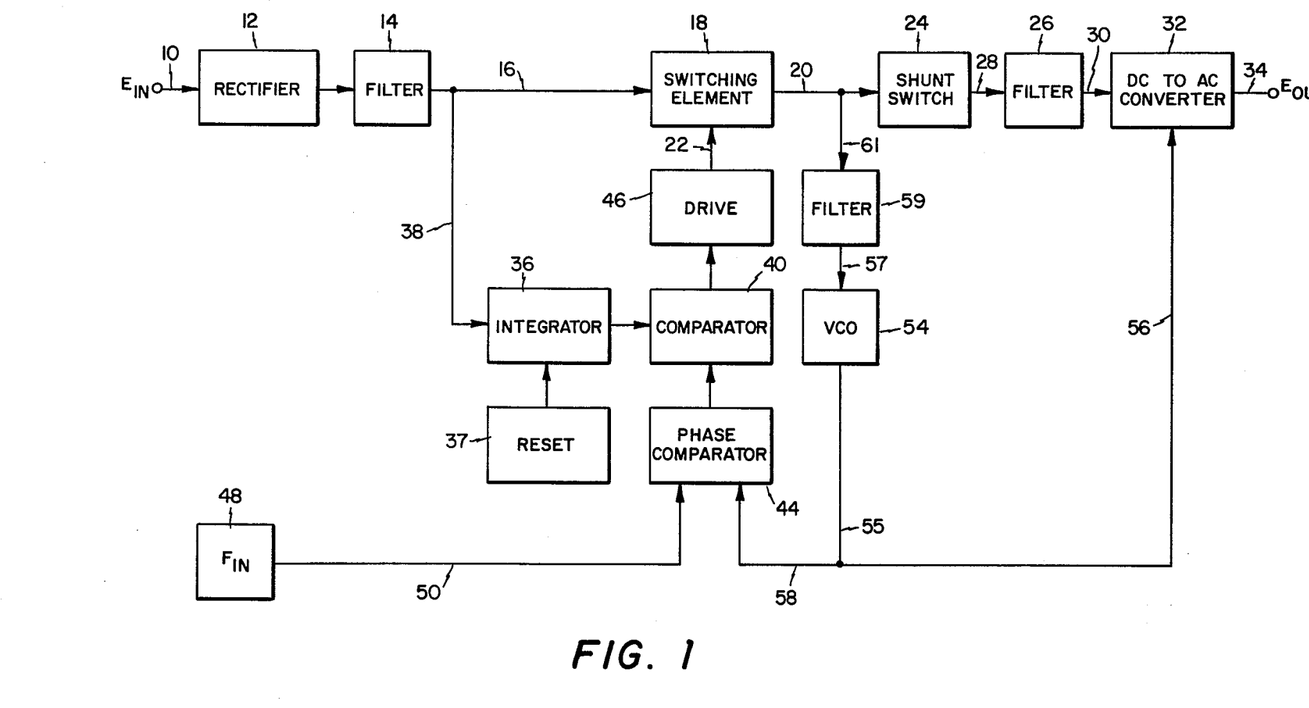
FIG. 1 is a block diagram of a link regulator.

Referring to FIG. 1, there is shown a block diagram of a link regulator utilizing the present invention. An alternating current (AC) voltage is input to a voltage input terminal 10 labeled $E_{IN}$. The AC voltage can either be single phase or three phase depending upon the type of application. The input terminal 10 is connected to a rectifier 12 for rectifying the AC voltage $E_{IN}$. The output of the rectifier 12 is input to a filter 14.

The filter 14 consists of an inductor and a capacitor and filters the output of the rectifier 12 to a direct current (DC) voltage. The DC voltage is output by the filter 14 on a signal line 16. The voltage on the line 16 is an unregulated DC voltage.

A series switching element 18 has an unregulated voltage input, a switched output and a control input. The unregulated input thereof is connected to the line 16, the switched output thereof is connected to a signal line 20 and the control input thereof is connected to a control line 22. The switching element 18 is series connected to connect the signal on the line 16 to the line 20. The signal on the control line 22 is operable to connect these two lines.

A shunt switch 24 receives the output of the switching element 18 on the line 20 and is operable to present a low impedance to the line 20 when the switching element 18 is open. The output of the shunt switch 24 is input to a filter 26 on a signal line 28. The filter 26 is operable to filter the output of the switching element 18 to average the switching pulses to a regulated DC voltage on a signal line 30.

A DC to AC converter circuit 32 converts the regulated DC voltage on the line 30 to an AC signal and outputs this AC signal on an output terminal 34 labeled $E_{OUT}$. The DC to AC converter 32 can either be a single phase device or a three phase device. The operation of the converter 32 is described in a copending application Ser. No. 343748, filed Jan. 29, 1982.

The unregulated DC voltage on the signal line 16 is input to an integrator 36 through a sense line 38. A reset circuit 37 provides a reset function for the integrator 36 and outputs a reset signal on a signal line 39 that is connected to the integrator 36. The output of the integrator 36 is input to one input of a comparator 40. The other input of the comparator 40 is connected to the output of a phase comparator 44. The phase comparator 44 provides a threshold for the comparator 40 that is proportional to the phase difference between two signals received on a first and second input on the phase comparator 44. The output of the comparator 40 is input to a drive circuit 46. The drive circuit 46 has the output thereof connected to the control line 22 to provide sufficient drive such that the output of the comparator 40 can control the switching element 18.

A variable frequency reference 48 provides a frequency reference $F_{IN}$ on a signal line 50. The frequency reference $F_{IN}$ is input to one input of the phase comparator 44 on the signal line 50.

A voltage controlled oscillator (VCO) 54 has an output frequency that is output on a signal line 55 and a control input for receiving a control signal on a control line 57. The output frequency of the VCO 54 on the signal line 55 is input to the second input of the phase comparator 44 on a feedback line 58 and also input to the DC to AC convertor 32 on a feedback line 56 to provide a reference frequency for the AC signal to synchronize with. A filter 59 has the input thereof connected to the line 20 through a sense line 61 and the output thereof connected to the control input of the VCO 54. The filter 59 filters the output of the switching element 18 to provide a control voltage for the VCO 54.

Figure 2:
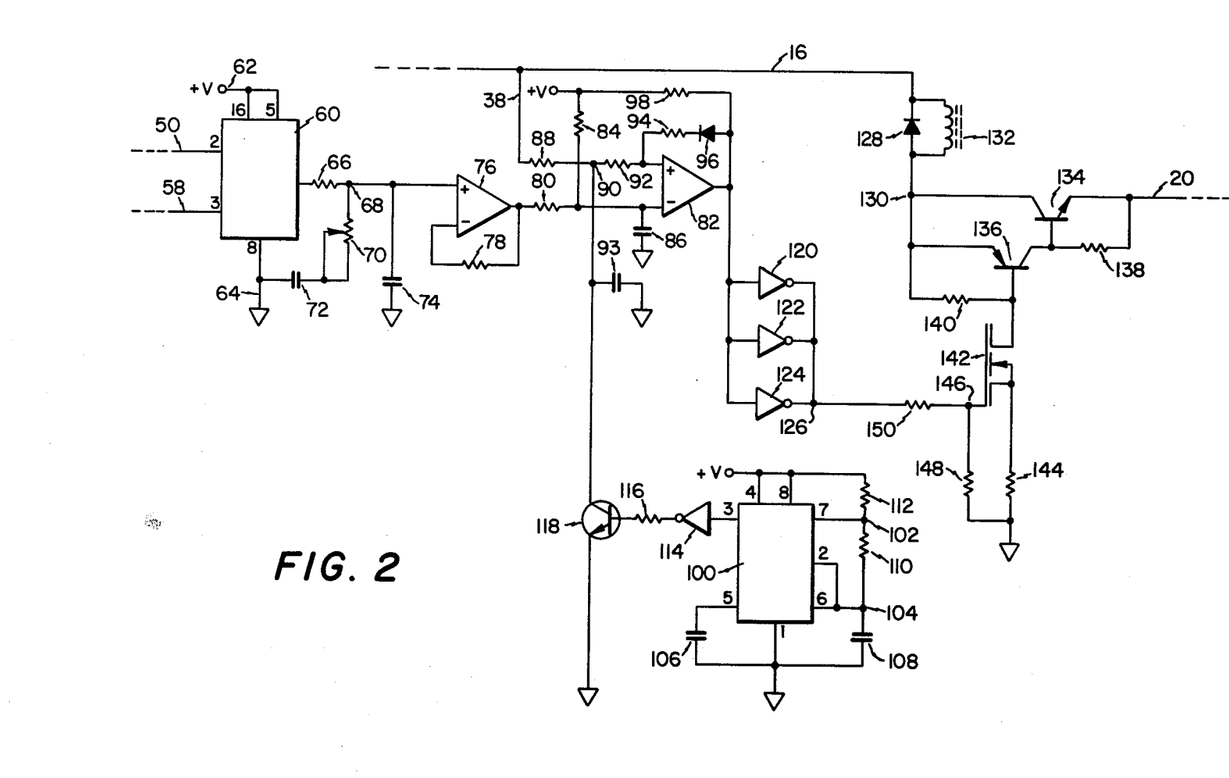
FIG. 2 is a schematic illustration of the feed forward system of the present invention.

Referring now to FIG. 2, there is shown a schematic diagram of the feedback network of FIG. 1. A phase comparator 60 has a first input thereof on pin 2 connected to the signal line 50 for receiving the reference frequency $F_{IN}$ that is output by the frequency reference 48. A second input thereof on pin 3 is connected to the feedback line 58 for receiving the signal from the VCO 54. Pin 16 and pin 5 of the phase comparator 60 are connected to a positive voltage terminal 62 and pin 8 thereof is connected to a ground terminal 64. Hereinafter the positive terminals are labeled +V and are referred to the positive terminal 62 and all ground terminals are referred to the ground terminal 64 and represented by a ground symbol. The voltage +V on the positive terminal 62 is a low voltage derived from a low voltage supply (not shown) and not from the regulated voltage on the output of the filter 26 of FIG. 1.

The phase comparator 60 is a portion of a phase lock loop of the type CD4046B manufactured by the solid state division of RCA. The phase comparator 60 is a digital phase comparator that has a tri-state output. The phase comparator 60 is sensitive to the phase difference between the leading edges of the signals on pins 2 and 3 thereof. When the phase difference is positive, the output on pin 13 is a logic high. When the phase difference thereof is negative, the output thereof is a logic low. Finally, when the phase difference is zero, the output on pin 13 floats, that is, it is open circuited. The output of the phase comparator 60 on pin 13 is connected to one end of a resistor 66. The other end of the resistor 66 is connected to a node 68. A potentiometer 70 has one end thereof connected to the node 68 and the other end thereof connected to one end of a capacitor 72. The wiper thereof is shorted to the other end thereof. The other end of the capacitor 72 is connected to the ground terminal 64. A capacitor 74 has one end thereof connected to the node 68 and the other end thereof connected to the ground terminal 64. The resistor 66 forms the series leg of an L-section low pass filter and the capacitors 72 and 74 and the resistor 70 form the shunt section thereof. The signal on the node 68 is a DC level that is the integral of the phase difference between the signals on pins 2 and 3 of the phase comparator 60. The operation of the phase comparator 60 will be described below in conjunction with the VCO 54.

An operational amplifier 76 has the positive input thereof connected to the node 68 and the negative input thereof is connected to one end of a resistor 78. The other end of the resistor 78 is connected to the output thereof. The operational amplifier 76 is connected as a voltage follower and the resistor 78 provides a certain degree of stability to the circuit. The voltage follower has unity gain and is operable as a buffer circuit. The phase comparator 60, the operational amplifier 76 and their associated circuitry are equivalent to the phase comparator 44 of FIG. 1.

A resistor 80 has one end thereof connected to the output of the operational amplifier 76 and the other end thereof connected to the negative input of a voltage comparator 82. A resistor 84 has one end thereof connected to the negative input of the comparator 82 and the other end thereof connected to the positive terminal 62. A capacitor 86 has one end thereof connected to the negative input of the comparator 82 and the other end thereof connected to the ground terminal 64. A resistor 88 has one end thereof connected to the sense line 38 and the other end thereof connected to a node 90. A resistor 92 has one end thereof connected to the node 90 and the other end thereof connected to the positive input of the voltage comparator 82. A capacitor 93 has one end thereof connected to the node 90 and the other end thereof connected to ground terminal 64. A resistor 94 has one end thereof connected to the positive input of the voltage comparator 82 and the other end thereof connected to the cathode of a diode 96. The diode 96 has the anode thereof connected to the output of the voltage comparator 82. A resistor 98 has one end thereof connected to the output of the voltage comparator 82 and the other end thereof connected to the positive terminal 62.

The negative input of the voltage comparator 82 comprises the reference input and the positive input thereof is the variable input of the comparator 40 of FIG. 1. The resistor 88 and the capacitor 93 form an integrator of the comparator 40 that has a varying voltage depending upon the charge on the capacitor 93. When the voltage on the positive input of the voltage comparator 82 exceeds the voltage on the negative terminal thereof, the output is a logic high. As the output thereof switches to a logic high, the diode 96 and the resistor 94 begin to conduct current thereby raising the voltage on the capacitor 93 slightly. This increase in voltage prevents residual noise that may be present on either of the inputs to the voltage comparator 82 from lowering the voltage on the positive input thereof below the voltage on the negative input thereof. This provides hysteresis for the comparator 40 of FIG. 1. When the voltage on the negative terminal thereof exceeds the voltage on the positive terminal thereof the output is a logic low. Depending upon the reference voltage applied to the negative input thereof, the output makes a transition from a logic low to a logic high when the voltage on the capacitor 93 exceeds the reference voltage on the negative input thereof. The voltage comparator 82 utilizes a type LM3302 comparator manufactured by National Semiconductor, Inc.

An integrated circuit 100 has pins 4 and 8 thereof connected to the positive terminal 62. Pin 7 thereof is connected to a node 102 and pin 2 and 6 thereof are connected to a node 104. Pin 5 thereof is connected to one end of a capacitor 106. Pin 1 thereof is connected to the ground terminal 64. The other end of the capacitor 106 is connected to the ground terminal 64. A capacitor 108 has one end thereof connected to the node 104 and the other end thereof connected to the ground terminal 64. A resistor 110 has one end thereof connected to the node 104 and the other end thereof connected to the node 102. A resistor 112 has one end thereof connected to the node 102 and the other end thereof connected to the positive terminal 62.

Pin 3 of the IC 100 is connected to the input of an IC inverter 114. The output of the inverter 114 is connected to one end of a resistor 116. The other end of the resistor 116 is connected to the base of a NPN transistor 118. The transistor 118 has the emitter thereof connected to the ground terminal 64 and the collector thereof connected to the node 90.

The IC 100 is of the type MC1455 manufactured by Motorola Semiconductor Products, Inc. and is a timer circuit and configured as an astable multivibrator. The output of the IC 100 on pin 3 is an asymmetrical waveform having negative going narrow pulses. The pulse width of the individual pulses therein is determined by the RC time constant of the resistor 110 and the capacitor 108. The time between the pulses is determined by the series combination of the resistors 110 and 112 and the capacitor 108. In the present invention, the resistor 110 is a 1 kilohm resistor and the resistor 112 is a 100 kilohm resistor. It can be seen that the pulse width determined by the resistor 110 and the capacitor 108 is narrow with respect to the time constant comprised of the resistors 110, 112 and the capacitor 108.

The inverter 114 inverts the waveform output by the IC 100 to provide a waveform with a series of positive going narrow pulses. Typically the pulse width of the narrow pulses is 8.4 microseconds and the time between pulses is approximately 780 microseconds. The transistor 118 is turned on when the output of the IC inverter 114 is a logic high and is turned off when the output thereof is a logic low. Since the collector of the transistor 118 is connected to one end of the capacitor 93, the capacitor 93 is effectively discharged when the transistor 118 is turned on.

An inverter 120, an inverter 122 and an inverter 124 each have the inputs thereof connected to the output of the comparator 82 and the outputs thereof connected to a node 126. The inverter IC's 120, 122 and 124 are connected in parallel to provide a higher drive capability for the comparator 82.

A diode 128 has the cathode thereof connected to the unregulated DC voltage line 16 and the anode thereof connected to a node 130. An inductor 132 has one end thereof connected to the unregulated DC voltage line 16 and the other end thereof connected to the node 130. An NPN transistor 134 has the collector thereof connected to the node 130 and the emitter thereof connected to the signal line 20. A PNP transistor 136 has the collector thereof connected to the base of the transistor 134 and the emitter thereof connected to the node 130. A resistor 138 has one end thereof connected to the signal line 20 and the other end thereof connected to the base of the transistor 134. A resistor 140 has one end thereof connected to the node 130 and the other end thereof connected to the base of the transistor 136. An N-channel FET 142 has the drain thereof connected to the base of the transistor 136, the source thereof connected to one end of a resistor 144 and the gate thereof connected to a node 146. The other end of the resistor 144 is connected to the ground terminal 64. A resistor 148 has one end thereof connected to the node 146 and the other end thereof connected to the ground terminal 64. A resistor 150 has one end thereof connected to the node 146 and the other end thereof connected to the node 126.

The transistor 134 is a pass transistor and comprises the main conducting portion of the switching element 18 of FIG. 1. The inverters 120, 122, 124, the N-channel FET 142 and the PNP transistor 136 are equivalent to the drive circuit 46 of FIG. 1. When a low logic state is applied to the input of the inverters 120, 122 and 124, a high logic signal is output on the node 126. This signal creates a low impedance between the source and the drain on the FET 142, thus drawing emitter-base current through the transistor 136. Because the resistor 140 also draws current, the transistor 136 does not go into saturation. When the transistor 136 is turned on, base to emitter current is allowed to flow through the transistor 134, thus saturating the collector of the transistor 134. This provides a conducting path between the control line 16 and the control line 20. When a logic low occurs on the node 126, the FET 142 is turned off and the transistors 134 and 136 are in the cutoff state.

Figure 3:
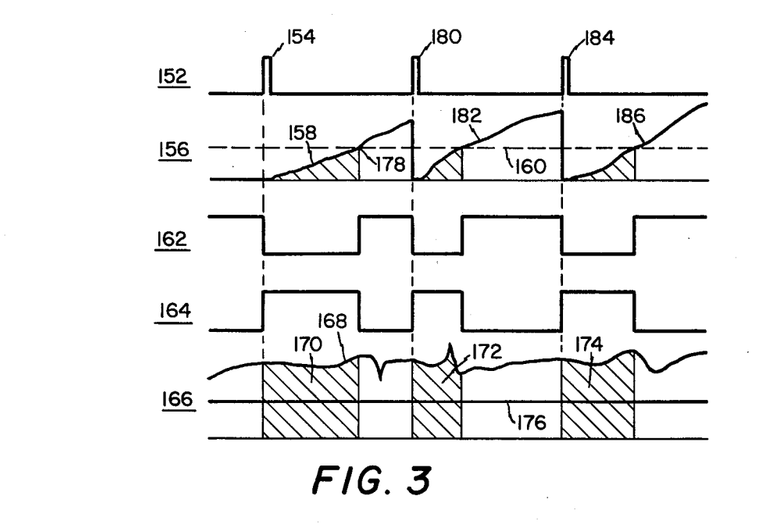
FIG. 3 is a diagram of the waveforms for the circuit of FIG. 2.

Now referring to FIG. 3, there is shown a diagram of the waveforms for the circuit of FIG. 2. A waveform 152 represents the signal that is output by the inverter 114. This signal is developed by the IC 100 that outputs a series of negative going pulses on pin 3 thereof. A positive going pulse 154 has a pulse width that is determined by the RC time constant of the resistor 110 and the capacitor 108, as described above. The logic low period of the waveform 152 is determined by the combination of the resistors 110 and 112 and the capacitor 108.

A waveform 156 represents the signal on the node 90 at the top of the capacitor 93. When the pulse 154 drives the base of the transistor 118 high, the signal on the top of the capacitor 93 is pulled to ground or zero volts. When the waveform 152 goes to a logic low, and the transistor 118 is in the cutoff state, the capacitor 93 begins to charge from the unregulated DC voltage line 16 through the resistor 88. This charging curve is represented by the curve 158 in the waveform 156. A dashed line 160 represents the threshold voltage or the voltage input to the negative input of the comparator 82.

A waveform 162 represents the output of the comparator 82 and a waveform 164 represents the output of the inverters, 120, 122 and 124. A waveform 166 represents the combination of the signals on the signal lines 16, 20 and 30. A curve 168 in the wavefom 166 represents the unregulated DC voltage on the signal line 16. A series of cross hatched areas 170, 172 and 174 represent the area under the curve 168 that is output by the switching element 18 of FIG. 1. A curve 176 represents the DC voltage output by the filter 26 on the signal line 30.

When the pulse 154 returns to a logic low in the waveform 152, the capacitor 93 begins to charge, as represented by the curve 158 in the waveform 156. When the curve 158 exceeds the threshold level 160 at a point 178, the output of the comparator 82 makes a transition from a low logic state to a high logic state, as represented by the waveform 162. The waveform 164 represents the driving function that is applied to the gate of the FET 142. The waveform 164 also corrolates with the closing of the pass transistor 134. Therefore, when the waveform 164 is high, the pass transistor 134 is closed. This allows the unregulated DC voltage on the curve 168 of the waveform 166 to be passed through to the signal line 20. For the duration of the pulses in the waveform 164, voltage is being supplied to the output of the switching element 18 on the line 20 and the unregulated voltage on the signal line 16 is integrated to the capacitor 93. This is represented by the shaded areas 170, 172 and 174 under the curve 168 of the waveform 166. This provides a volt/second relationship. Since the threshold 160 of the waveform 156 is constant, the unregulated DC voltage on the signal line 16 is integrated on to the capacitor 93 until the threshold 160 is exceeded which provides a constant volt/second. Although the capacitor 93 continues to store charge, as represented by the curve 158, the unregulated DC voltage is disconnected from the signal line 20 thereby terminating the time that the voltage is input to the filter 26.

A pulse 180 on the waveform 152 represents an additional reset pulse for the capacitor 93 that occurs after the pulse 154. The shaded area 172 of the waveform 166 represents the time that the pass transistor is conducting in response to the pulse 180. The pulse 180 corresponds to the beginning of and integration curve 182 on the waveform 156 and in a similar manner a pulse 184 on the waveform 152 corresponds to the beginning of an integration curve 186 on the waveform 156. For illustration purposes, the area under the curves 158, 182 and 186 is shaded between the start of integration and the point at which the curve exceeds the threshold voltage 160. These shaded areas correspond to the shaded areas 170, 172 and 174, respectively, of the waveform 166. It can be seen that the time between the start of integration to the termination of integration, that is, when the threshold voltage 160 is exceeded, that each of the shaded areas 170, 172 and 174 has a separate duration. This differing duration is due to the irregularities in the unregulated DC voltage on the signal line 16, as represented by the curve 168 in the waveform 166. If the unregulated voltage increases, then the integration time, or the time required to reach the threshold 160, is decreased. If the unregulated voltage decreases then the integration time increases.

Since the shaded areas 170, 172 and 174 represent a constant volts/seconds, the filter 26 averages these waveforms out and removes the time portion, thus leaving the constant voltage. This is represented by the curve 176 in the waveform 166.

In order to vary the level of the DC voltage on the signal line 30, it is only necessary to vary the threshold voltage on the negative input of the comparator 82. This threshold voltage effectively sets the volts/seconds that are integrated when the switching element 18 is conducting.

Figure 4:
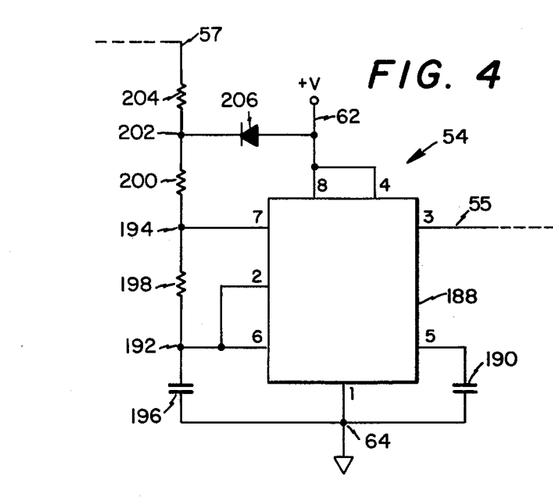
FIG. 4 is a schematic illustration of the voltage controlled oscillator of FIG. 1.

Referring now to FIG. 4, there is shown a schematic diagram of the VCO 54 of FIG. 1. An integrated circuit 188 has pin 8 and pin 4 thereof connected to the positive voltage terminal 62 and pin 1 thereof connected to the ground terminal 64. Pin 5 thereof is connected to one end of a capacitor 190 and pin 3 thereof is connected to the signal line 56. Pins 2 and 6 thereof are connected to a node 192. Pin 7 thereof is connected to a node 194. The other end of the capacitor 190 is connected to the ground terminal 64. A capacitor 196 has one end thereof connected to the node 92 and the other end thereof connected to the ground terminal 64. A resistor 198 has one end thereof connected to the node 192 and the other end thereof connected to the node 194. A resistor 200 has one end thereof connected to the node 194 and the other end thereof connected to a node 202. A resistor 204 has one end thereof connected to the node 202 and the other end thereof connected to the sense line 38. A diode 206 has the cathode thereof connected to the node 202 and the anode thereof connected to the positive voltage terminal 62.

The IC 188 is a timer IC of the type MC1455 manufactured by Motorola Semiconductor Products, Inc. and is similar to the IC 100. The IC 188 is configured as an astable multivibrator outputting a sequence of negative going pulses on pin 3 thereof. The pulse width of the negative going pulses thereof is determined by the RC time constant of the combination of the resistor 198 and the capacitor 196. The duration of the time between pulses is determined by the voltage level on the node 194. The IC 188 has an internal threshold (not shown) that determines the point at which the output thereof changes states. The voltage on the node 194 is determined by the charge time of the capacitor 196. Depending upon the level of the DC voltage on the control line 38, the charge time for the capacitor 196 can vary. The resistors 198, 200 and 204 determine the charge rate of the capacitor 196 as well as the voltage level on the control line 38. As the voltage level on the control line 38 varies, so does the charge time of the capacitor 196. This in turn varies the time between the output pulses on pin 3 of the IC 188. This effectively provides a voltage controlled oscillator (VCO) that is controlled by the level of the DC voltage output by the filter 59 of FIG. 1.

Referring now to FIGS. 1-4, the operation of the switching regulator will be described in more detail. The frequency $F_{IN}$ of the frequency source 48 and the output of the VCO 54 are input to the phase comparator 44. The phase comparator 44 compares the phase of the two frequencies and outputs a phase difference signal. When the phase of the two signals is different, the output of the phase comparator 44 generates a slightly positive signal or a slightly negative signal depending upon whether there is a positive or negative phase difference. When the phase difference is 0 the output thereof is maintained at a constant voltage. The output of the phase comparator 44 supplies the threshold input for the comparator 40. As described above, this threshold determines the duration that the switching element 18 conducts, thus determining the volts/seconds that are delivered to the signal line 20.

The filter 26 filters the signal on the signal line 20 to provide a DC voltage on the signal line 30 at the output of the filter 26. This DC voltage is proportional to the threshold voltage that is input to the comparator 40. Since the output of the phase comparator 44 is directly related to the voltage that is input to the control input of the VCO 54, this completes a loop for a basic phase lock loop. The loop time constant is determined by the filter 59 and the characteristics of the integrator 36, the comparator 40 and the drive circuit 46. This is an important aspect of the present invention in that a complete phase lock loop has been realized in addition to providing a regulated DC voltage.

Figure 5:
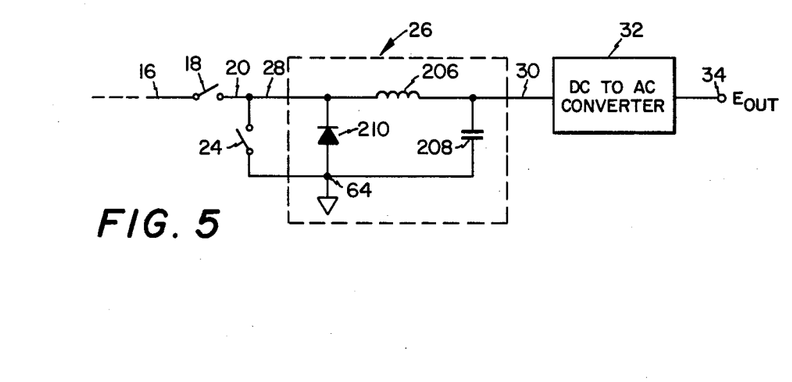
FIG. 5 is a schematic illustration of the filter of FIG. 1.

Referring now to FIG. 5, there is shown a schematic illustration of the switching element 18, the shunt switch 24 and the filter 26 of FIG. 1. The shunt switch 24 is represented as a single pole switch having one end thereof connected to the line 20 and the other end thereof connected to the ground terminal 64. The switching element 18 is represented as a single pole throw switch having one end thereof connected to the line 16 and the other end thereof connected to the line 20. The shunt switch 24 presents a short circuit across the input of the filter 26 when the switching elment 18 is not conducting. An inductor 206 has one end thereof connected to the output of the shunt switch 24 and the other end thereof connected to the output of the filter 26. A capacitor 208 has one end thereof connected to the output of the filter 26 and the other end thereof connected to the ground terminal 64. A diode 210 has the cathode thereof connected to the output of the shunt switch 24 and the anode thereof connected to the ground terminal 64.

The output of the filter 26 is connected to the input of the DC to AC converter 32 of FIG. 1 and the output of the converter 32 is connected to the output terminal 34. When a load is connected between the output terminal 34 and the ground terminal 64, a current is drawn from the output of the filter 24. This current varys depending upon the load.

To better understand the operation of the switch 24 and the advantages thereof, it is necessary to describe the filtering operation of the inductor 206 and the capacitor 208 in more detail. When the switch 18 closes and the switch 24 opens, current begins to flow through the inductor 206 to the capacitor 208. As long as the switch 18 is closed and the voltage on the line 16 is higher than the voltage on the capacitor 208, the di/dt for the inductor 206 is positive. When the switch 18 opens and the switch 24 closes, the di/dt of the inductor is negative, or the current therethrough is decreasing.

For high load currents, the current in the inductor 206 never decays to zero because the switch 18 closes periodically to maintain regulation. This switching is described above with reference to FIG. 3. However, when the load current is low, there is a possibility that the current through the inductor 206 may decay to zero. When this occurs, the voltage on the line 28, without the switch 24, increases as a step function to the voltage on the capacitor 208. The result is an increasing voltage on the capacitor 208. This voltage has a peaking effect that increases as the load current decreases. With the addition of the switch 24, this peaking effect can be eliminated which is an important aspect of the present invention because it allows a switching regulator to operate under no load conditions. Using the diode 210 alone, this increasing voltage can damage or degrade the components in the DC to AC converter 32 by exceeding their voltage ratings. With the addition of the switch 24, this has been eliminated and an improved load range is realized. This switch is synchronous with the switch 18, thus providing a synchronous switch for presenting a low impedance to the input of the filter 26 when the switch 18 is not conducting. In addition, the current flowing through the switch 24 is essentially the ripple current thereby providing low losses to the overall system.

In summary, a link regulator is provided that maintains a DC regulation that is a function of a driving frequency. The driving frequency is phase synchronized with the output driving frequency of the DC to AC converter. This allows the DC regulation to be maintained over a wide range of input frequencies. In addition, a feed forward control circuit is utilized to maintain sensitivity over this wide frequency range.

Although the preferred embodiment of the present invention has been described in detail, it should be understood that various changes, substitutions and alterations can be made therein without departing from the spirit and scope of the invention as defined by the appended claims.

We claim:

1. A method for controlling a switching regulator to convert an unregulated DC voltage level to a regulated DC voltage level, comprising:
   generating a pulse waveform, each pulse therein turning a series switch on to conduct current from the unregulated DC voltage level;
   sensing the level of the unregulated DC voltage level on the input of the switch;
   generating an integrated voltage signal that is the integral of the sensed unregulated DC voltage level with respect to time;
   generating a threshold voltage;
   comparing the integrated voltage level with the threshold voltage and turning the switch off when the integrated voltage level exceeds the threshold voltage such that a constant volts/seconds signal is generated on the output of the switch;
   resetting the integrated voltage level to zero when the generated pulse waveform turns on the switch;
   filtering the output of the switch to provide the regulated DC voltage level, the regulated DC voltage level being proportional to the preset threshold voltage;
and
   varying the threshold voltage in response to variations in the regulated DC voltage level to maintain the DC voltage level constant.

2. The method of claim 1 wherein the step of integrating comprises charging a capacitor through a series resistor from the unregulated DC voltage level.

3. The method of claim 1 wherein the step of filtering comprises inputting the signal output from the switch to a series connected inductor for storage in a shunt connected capacitor and further comprising the step of switching the output of the switch to ground when the switch is off to provide a low impedance for the input of the series inductor such that peaking is prevented.

4. A method for controlling a link regulator to convert an unregulated DC level to a regulated DC level, comprising:
generating a reference frequency signal;
generating a driving frequency signal that has a frequency that is proporational to the regulated DC level;
turning a series switch on to connect the unregulated DC voltage level on the input of the switch to the output thereof;
sensing the level of the unregulated DC voltage on the input of the switch;
integrating the unregulated DC voltage level over time to provide an integrated voltage level;
comparing the phase of the driving signal to the phase of the reference signal and generating a threshold level;
comparing the integrated voltage level with the threshold level and turning the switch off when the integrated voltage level exceeds the threshold level such that a constant volts/seconds relationship is obtained on the output of the switch;
resetting the integrated voltage level to zero and turning the switch back on after a predetermined duration of time has elapsed from the preceding closure of the switch;
filtering the output of the switch to provide the regulated DC voltage level that is proportional to the threshold level;
sensing the regulated DC voltage level; and
varying the threshold voltage level in response to changes in the sensed regulated DC voltage level such that the regulated DC voltage is maintained at a constant level.

5. The method of claim 4 wherein the step of filtering comprises inputting the output signal from the switch into an L-section filter with a series inductor and a shunt capacitor and further comprising providing a low impedance on the output of the switch when the switch is turned off and removing the low impedance when the switch is turned on such that peaking is inhibited.

6. The method of claim 4 wherein the step of integrating comprises the step of charging a capacitor through a series resistor.

7. The method of claim 6 wherein the step of resetting comprises the steps of:
generating a pulse waveform having a narrow positive going pulse and a low duty cycle; and
driving a shunt switch for discharging the capacitor to reset the integraged voltage level to zero.

8. A method for regulating a link regulator to convert an unregulated DC voltage to a regulated DC voltage, comprising:
generating a reference frequency signal;
generating a variable frequency driving signal, the driving signal having a frequency that is variable as a function of the level of the regulated DC voltage;
turning a series switching element on to conduct current from the unregulated DC voltage;
comparing the phase of the reference signal and the phase of the driving signal to provide a phase error signal;
sensing the unregulated DC voltage;
integrating the sensed unregulated DC voltage with respect to time to generate an integrated voltage level;
comparing the phase error signal and the integrated voltage level and turning the series switching element off when the integrated voltage level exceeds the level of the phase error signal such that the signal output from the switch has a volts/seconds relationship dependant upon the phase error signal;
presenting a low impedance on the output of the switching element when the switching element is not conducting and removing the low impedance when the switch is turned back on;
periodically resetting the integrated voltage level to zero and turning the series switching element on such that a series of signals are periodically output by the switching element having a volts/seconds relationship dependant on the level of the phase error signal; and
filtering the output of the switching element to provide the regulated DC voltage level;
variations in the regulated DC voltage level causing the frequency of the driving signal to change and thus changing the level of the phase error signal, a change in the phase error signal causing the volts/seconds relationship to change to compensate the regulated DC voltage.

9. The method of claim 8 wherein the step of presenting a low impedance comprises shunting the output of the switching element to a ground reference.

10. The method of claim 8 wherein the step of filtering comprises inputting the signal from the switching element into a series inductor and capacitively filtering the output of the series inductor with a shunt capacitor.

11. The method of claim 8 wherein the step of presenting a low impedance comprises shunting the output of the switching element to a ground reference and the step of filtering comprises inputting the signal from the switching element into a series inductor and capacitively filtering the output of the series inductor with a shunt capacitor wherein the low impedance presented on the output of the switching element prevents the output of the series inductor from being reflected back to the output of the switching element when the current through the series inductor decays to zero.

12. A circuit for controlling a switching regulator, comprising:
a series switch having one end thereof connected to an unregulated DC voltage;
means for turning said switch on;
means for sensing the level of said unregulated DC voltage;
means for integrating said unregulated DC voltage level over time to provide an integrated voltage level;
means for generating a threshold voltage;
means for comparing said integrated voltage level with said threshold voltage and turning said switch off when said integrated voltage level exceeds said threshold voltage such that the integral of said unregulated DC voltage over the time said switch is on is dependant on said threshold voltage to provide a volts/seconds relationship that is dependant on said threshold voltage;

means for generating a pulse waveform, each pulse therein for turning on said switch and resetting said integrated voltage level to zero such that a series of integrated signals are generated having a volts/seconds relationship dependant upon said threshold voltage;

means for filtering the output of said switch to remove the time portion of the volts/seconds relationship on the signal output from said switch to provide a regulated DC voltage; and means for varying said threshold voltage to maintain the volts/seconds relationship constant such that said regulated DC voltage also remains constant.

13. The circuit of claim 12 wherein said means for integrating comprises a resistor having one end thereof connected to said unregulated DC voltage and the other end thereof connected to one end of a capacitor, the other end of said capacitor connected to a ground reference such that said capacitor integrates said unregulated DC voltage.

14. The circuit of claim 12 wherein said means for generating a threshold voltage comprises:
  a reference frequency;
  a driving frequency;
  a phase comparator having a first and second input, the first input thereof for receiving said reference frequency and the second input thereof for receiving said driving frequency; and
  a filter for filtering the output of said phase comparator to provide said threshold voltage, said means for varying comprising means for varying said driving frequency as a function of the level of said regulated DC voltage.

15. The circuit of claim 12 wherein said means for comparing comprises:
  a voltage comparator having a first and second input, said first input for receiving said integrated voltage level and said second input for receiving said threshold voltage, the output thereof changing states from logic high to logic low when said integrated voltage level exceeds said threshold voltage and the output thereof changes states from logic low to logic high when said integrated voltage level is less than said threshold voltage.

16. The circuit of claim 12 wherein said means for generating comprises an astable multivibrator.

17. The circuit of claim 12 wherein said filtering means comprises an L-section filter with a series inductor and a shunt capacitor and further comprising a single pole single thow electronic shunt switching element for presenting a low impedance to the input of said means for filtering when said switch is off and removing the low impedance when said switch is on.

18. A circuit for controlling a link regulator, comprising:
  a series switch having one end and thereof connected to an unregulated DC voltage;
  means for generating a reference frequency signal;
  means for generating a driving frequency signal;
  means for turning said switch on to conduct current from said unregulated DC voltage;
  means for sensing the level of said unregulated DC voltage;
  means for integrating said sensed unregulated DC voltage level over time to provide an integrated voltage level;
  first means for comparing the phase of said driving frequency to the phase of said reference frequency and generating a threshold level that is dependant on the phase difference between said driving and reference frequencys;
  second means for comparing said integrated voltage level with said threshold level and turning the switch off when said integrated voltage level exceeds said threshold level such that the integral of said unregulated DC voltage over the time said switch is closed provides a volts/seconds relationship that is dependant upon said threshold;
  means for generating a pulse waveform, each pulse therein for turning on said switch and resetting said integrated voltage level to zero to provide a sequence of signals having a volts/seconds relationship determined by said threshold;
  means for filtering the output of said switch to provide a regulated DC voltage that is proportional to said threshold level;
and
  means for varying said driving frequency as a function of said regulated DC voltage to provide feedback to control the level of said threshold to maintain a constant level for said regulated DC voltage.

19. The circuit of claim 18 further comprising a single pole single throw shunt switching element for presenting a low impedence to the input of said means for filtering when said series switch is off.

20. The circuit of claim 18 wherein said means for generating said driving frequency comprises a voltage controlled oscillator.

21. The circuit of claim 18 wherein said means for integrating comprises a series resistor having one end thereof for receiving said unregulated DC voltage and the other end thereof connected to one end of a capacitor, the other end of said capacitor connected to a ground reference.

22. The circuit of claim 18 wherein said first means for comparing comprises a phase detector having a first and second input, said first input for receiving said driving frequency and said second input for receiving said reference frequency, the output thereof providing a phase error signal; and
  a filter having a first resistor with one end thereof for receiving said phase error signal and the other end thereof connected to one end of a second resistor, the other end of said second resistor connected to a ground reference and a capacitor having one end thereof connected to the other end of said first resistor and the other end of said capacitor connected to a ground reference such that said filter integrates said phase error signal.

23. The circuit of claim 18 wherein said second means for comparing comprises:
  a comparator having a positive input and a negative input, said negative input for receiving said threshold level and said positive input for receiving said integrated voltage level, the output of said comparator changing states from low to high when said integrated voltage level increases to a level exceeding said preset voltage level and the output of said comparator changes from a logic high to a logic low state when the level of said integrated voltage level decreases below said threshold level; and
  an inverter circuit for inverting the output of said comparator.

24. The circuit of claim 18 wherein said means for generating a pulse waveform comprises an astable multivibrator having a plurality of narrow positive going pulses.

25. The circuit of claim 18 wherein said means for filtering comprises an L-section filter having an inductor in the series leg thereof and a capacitor in the shunt leg thereof.

26. The circuit of claim 18 wherein said means for converting comprises a bridge network.

* * * * *